J. KENNEDY.
AUTOMATIC BREAD MOLDING MACHINE.
APPLICATION FILED SEPT. 25, 1919.

1,420,486.

Patented June 20, 1922.

INVENTOR.
Joseph Kennedy
by Henry Marok Jr.
ATTORNEY.

UNITED STATES PATENT OFFICE.

JOSEPH KENNEDY, OF PROVIDENCE, RHODE ISLAND.

AUTOMATIC BREAD-MOLDING MACHINE.

1,420,486.  Specification of Letters Patent.  Patented June 20, 1922.

Application filed September 25, 1919. Serial No. 326,418.

*To all whom it may concern:*

Be it known that I, JOSEPH KENNEDY, a subject of George V, King of Great Britain and Ireland, residing in Providence, in the county of Providence and State of Rhode Island, have invented a new and useful Automatic Bread-Molding Machine, of which the following is a specification.

The purpose of my invention is to provide a machine which will automatically and accurately shape a mass of kneaded dough into a loaf of the desired form preparatory to baking it.

To this end my invention consists in the new and novel construction, combination and arrangement of parts hereinafter described and illustrated in the accompanying drawings, in which,—

Similar reference letters and numerals indicate like parts where they occur in the several views.

Figure 1:
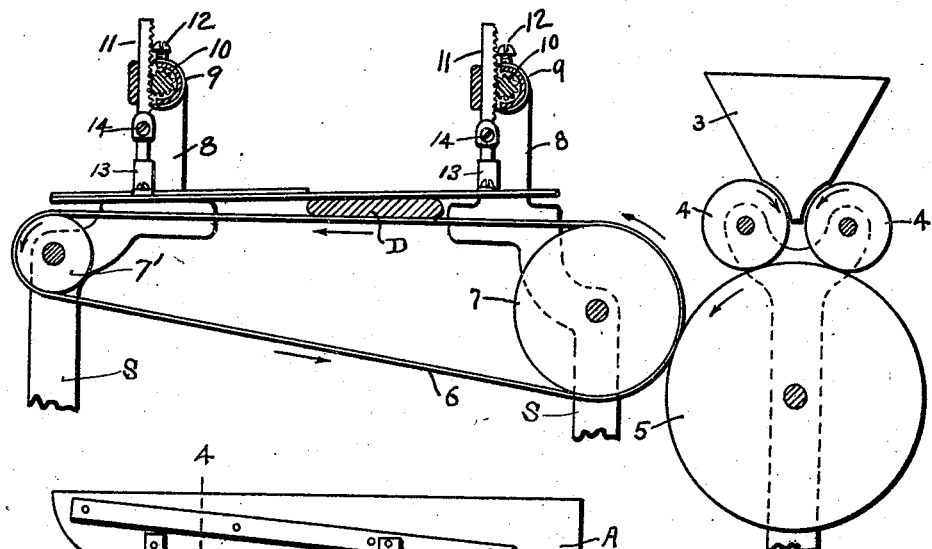
Figure 1 is a side elevation of my machine, the molding plate adjusting means being shown partly in section.

In the bread making art one of the standard shaped loaves is termed a "Vienna" loaf. It is practically of the form of a circular spindle, i. e. pointed at each end and having a greatly enlarged central cross section. It has customarily been formed by the hands of the baker,—a difficult and time consuming operation which did not uniformly produce the desired properly shaped loaf.

Practical operation of my machine has demonstrated that it will automatically, rapidly and accurately form loaves of the standard "Vienna" shape from a mass of kneaded dough.

While my machine with obvious modifications in the form of the molding plate will mold any shaped loaf, I have, for convenience, shown in the accompanying drawings the form adapted to form a "Vienna" loaf.

I am aware that prior to my invention there have been known and used in machines for making "Vienna" loaves, a pressure or molding board having a tapered aperture in one end intended to permit the central portion of a mass of dough passing under the board to expand more than the ends of the mass to thereby form what is known as a "Vienna" loaf. Boards of that character in practical use proved incapable of forming a perfect and symmetrical "Viena" loaf for the reason that the side walls of said aperture were vertical and at their junction with the lower plane surface of the board formed a square corner which cut into the dough and formed ridges which destroyed the symmetry of the loaf and rendered it unmerchantable as a "Vienna" loaf. Or in the terms of the baker's art the loaf would not "prove." Many attempts to overcome this defect in the pressure or molding board have been unsuccessfully made. I have invented means for successfully removing the objectionable features of such pressure or molding boards. Instead of the aperture having vertical side walls I have invented a molding board having a V-shaped slot at one end and have made the side walls thereof convex so that at the junction of the walls with the lower plane surface of the board a rounded corner will be formed which has in practical use in bread making machines uniformly produced "Vienna" loaves of perfect and symmetrical and merchantable shape, the dough passing in every instance under the board and emerging without being cut or its symmetry destroyed. In other words the loaf in every instance has "proved."

In the drawings A represents my newly invented molding plate provided at one end with a V-shaped slot $A^1$ having convex side walls forming at the junction with the upper and lower plane surfaces of the board A rounded corners $A^2$, the lower corner arranged and adapted to allow the mass of dough in passing under the board to expand more in its center than at its ends without cutting or making ridges in its surface.

Figures 2, 5:
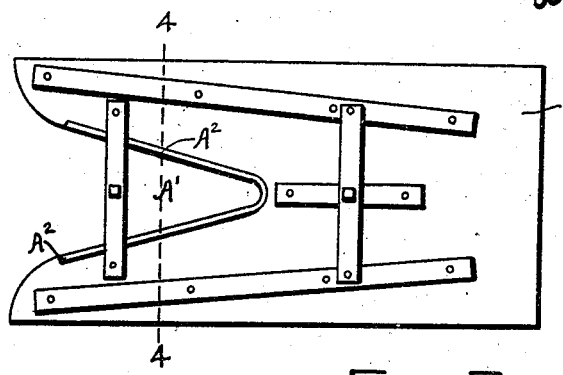
Figure 2 is a plan view of the molding plate, of the form adapted to form a "Vienna" loaf.
Figure 5 is a plan view of a "Vienna" loaf.
Figure 4:
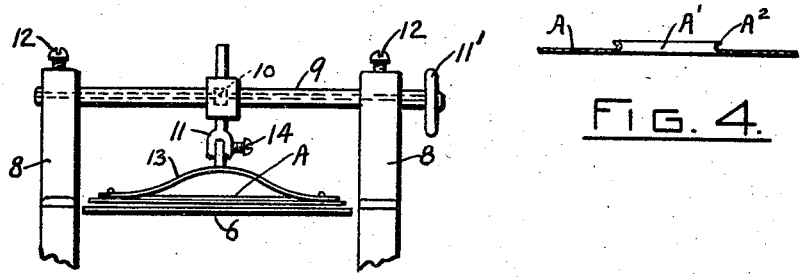
Figure 4 is a cross sectional view of the molding plate taken on line 4—4 of Fig. 2.
Figure 3:
Figure 3 is an end view of the molding plate and its adjusting means.

For the purposes of adjusting the molding plate A relatively to the conveyer apron of the machine in order to secure uniform sized loaves, and for holding the plate in its adjusted position, with provision for permitting the plate automatically to tilt to permit in emergency the passage of an over size mass of dough I mount upon each end of the plate a transversely directed spring, as 13, extending practically from side to side of the plate (Fig. 2) and having a vertically directed stud mounted centrally on the spring and engaging a vertically extending rack 11 which is held in engagement with the stud by a set screw 14. Said rack is operatively connected with a pinion 10 carried on a horizontally extending rod supported at each end by standards 8, 8, disposed at opposite sides of the frame of the machine. Said rod extends through a sleeve which extends from one standard to the opposite one. The rack and pinion operate through a housing carried on the sleeve and the rod is actuated by a hand wheel $11^1$, and is locked in the adjusted position of the rack and plate by set screws 12, 12, seated in the standards.

By the combination and arrangement of the parts described I am enabled to adjust and hold in its adjusted position the molding plate at the required distance above the conveyer apron to form the desired sized loaves, while the springs 13 will allow the respective ends of the plate to automatically rise or tilt successively as occasion may demand to permit an excess mass of dough to move freely along without clogging or stopping the machine, or unduly interfering with the passage of the following masses of dough.

In case of extreme emergency the rack 11 may, by turning the hand wheel $11^1$ be quickly raised to permit the molding plate to be raised until the mass of dough has been removed or allowed to pass along, when reversing the movement of the wheel $11^1$ the plate will be returned to its original position. These are novel and important features of my invention and practical use of them in the art of bread making has demonstrated that they will with certainty and efficiency automatically perform the function of permitting the passage of an excess mass of dough through the machine without clogging or stopping the machine, a function which other known devices have in the art of bread making by machines in practical use proved incapable of performing.

The machine is equipped with the well known hopper 3, which may be dispensed with, the feed rolls 4, 4, 5, the endless conveyor apron 6, and its pulleys 7, $7^1$. The mass of kneaded dough D is carried by the apron under the plate A, (Fig. 1), the feed rolls, pulleys and apron travelling as indicated by the arrows.

It is obvious that the plate A may be concave or flat on its under face according to the shape of loaf it is desired to form.

The parts hereinbefore described are supported on a frame, and are actuated by power, electric or otherwise, in the well known way.

In the practical operation of my machine the mass of kneaded dough is fed to the hopper 3 and passing to the feed rolls 4, 4, 5, is taken by the conveyer apron 6 and carried under the molding plate A. In the form of plate shown in the drawings the mass will expand in its central section when passing under the V-slot, while the solid portions of the plate A will taper it at each end. By omitting the V-slot the plate may be efficiently used to form other shaped loaves depending on the conformation of the plate. When the hopper 3 is dispensed with the mass of dough is fed directly into the feed rolls 4, 4. The operative parts of the machine are supported, as by standards S, S, or upon a table or frame.

In case too large a mass of dough should be fed into the machine the springs 13 will permit the adjacent part of the plate to tilt or rise and allow the mass to pass freely thereby preventing any clogging of the machine or stoppage of the run of other masses of dough following such mass.

I claim as my invention and desire to secure by Letters Patent:

1. In a machine for molding bread loaves having means for conveying a mass of dough and a molding plate adjustably positioned above said conveyer, the combination with said molding plate of the described adjusting means, the same comprising transversely extending half elliptic springs mounted one on said plate near each end thereof and each provided with a vertically extending stud disposed centrally of the spring, vertically reciprocating racks each engaging its adjacent stud, pinions supported above said plate in engagement each with its adjacent rack, means for rotating said pinions and other means for locking the pinion carrying means to hold the plate yieldingly in its adjusted position.

2. In a bread molding machine the combination with a loaf molding plate of transversely extending springs mounted one near each end of said plate, vertically reciprocating racks each engaging its adjacent spring, pinions operatively supported above said molding plate and engaging each its adjacent rack and means for actuating said pinions.

3. In a bread molding machine the combination with a loaf molding plate of transversely extending springs mounted on said plate, one near each end thereof, vertically reciprocating racks engaging respectively one of said springs, pinions rotatably supported above said molding plate in engagement each with its adjacent rack, whereby said racks are arranged and adapted to yield alternately to permit the ends of the molding plate to successively rise or tilt to allow the passage of an excess mass of dough under said plates without stopping or clogging the machine.

JOSEPH KENNEDY.

Witnesses:
Wm. C. Kenyon,
P. M. Hunter.